June 24, 1930.   E. J. TUCKER   1,765,639
TRACTOR CANOPY
Filed June 18, 1929    3 Sheets-Sheet 1

Inventor
E. J. Tucker

By Clarence A. O'Brien
Attorney

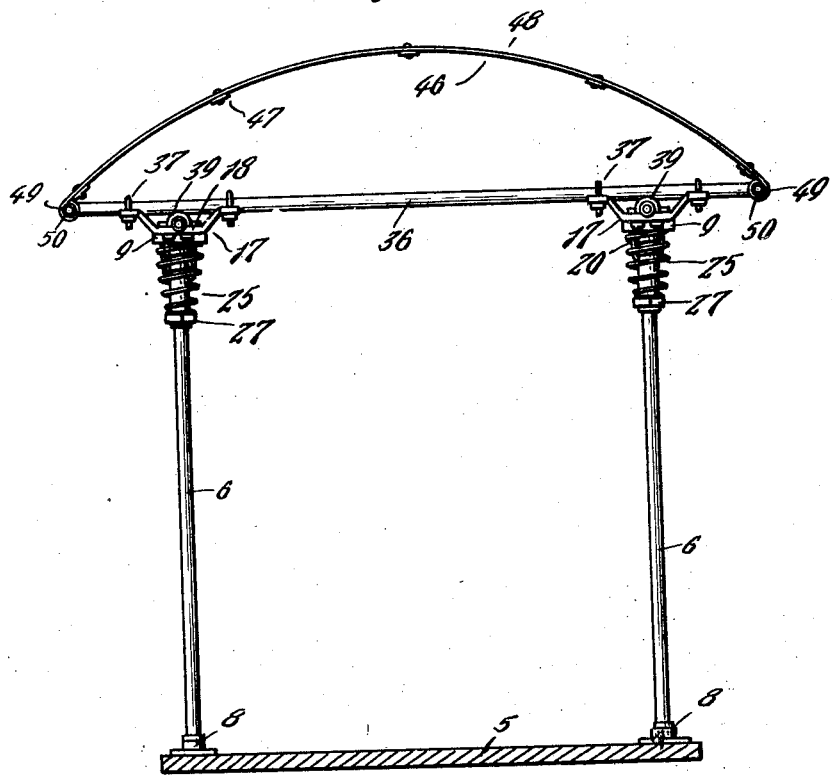

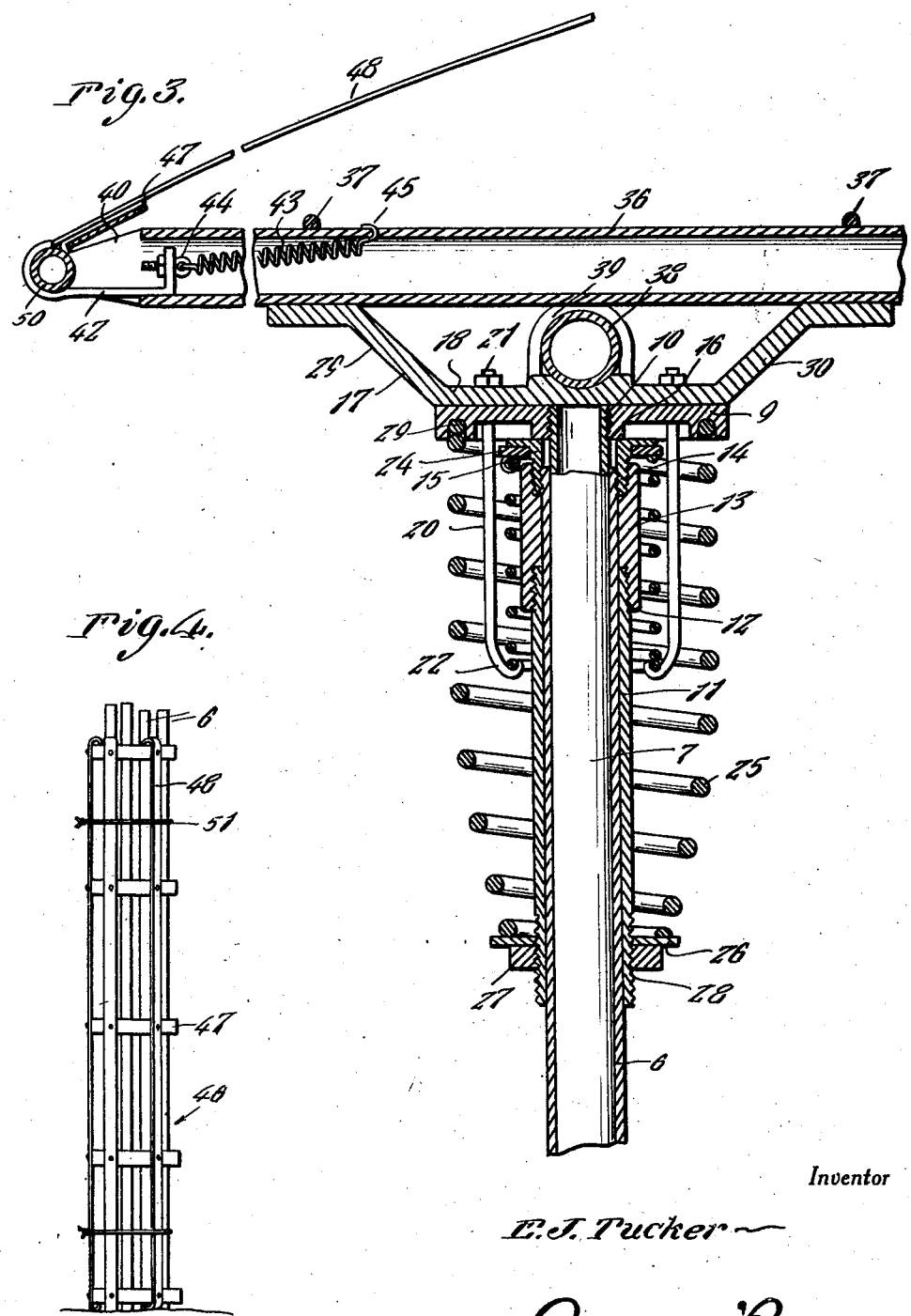

Patented June 24, 1930

1,765,639

UNITED STATES PATENT OFFICE

ELA J. TUCKER, OF NATIONAL CITY, CALIFORNIA

TRACTOR CANOPY

Application filed June 18, 1929. Serial No. 371,831.

This invention relates to canopies and has more particular reference to a canopy especially adapted for use on tractors that can be assembled and disassembled easily and quickly on the tractor, and which is very light and durable in structure.

Another very important object of the invention is to provide a canopy of this nature that is capable of withstanding the vibration and jar of the tractor, that is capable for use on any size tractor, and which when removed from the tractor may be rolled up in a very small bundle to provide a neat and compact unit.

Another very important object of the invention is to provide a canopy that can be mounted on the tractor, that is resilient in structure, so that the canopy will not be damaged by striking some stationary object while the tractor is in motion but is capable of give and adapted to readily right itself after being struck.

Another very important object of the invention is to provide a canopy of this nature which is very simple in its construction, can be easily set upon the tractor by one individual, and which can be readily and easily assembled without the necessity of screwing and unscrewing bolts, which will not rattle when the tractor is in motion, and which otherwise is very durable, very efficient and otherwise well adapted for the purpose designed.

Other objects and advantages of the invention will become apparent during a study of the following description taken in connection with the drawings, wherein:

Figure 2 is an end elevation thereof.

Figure 3 is a detail sectional view illustrating the connecting means between the support and tractor and canopy frame.

Figure 4 is a diagrammatic view showing the frame of the canopy when in a rolled position.

Figure 5 is a top plan view of a frog forming an embodiment of this invention.

Figure 1:
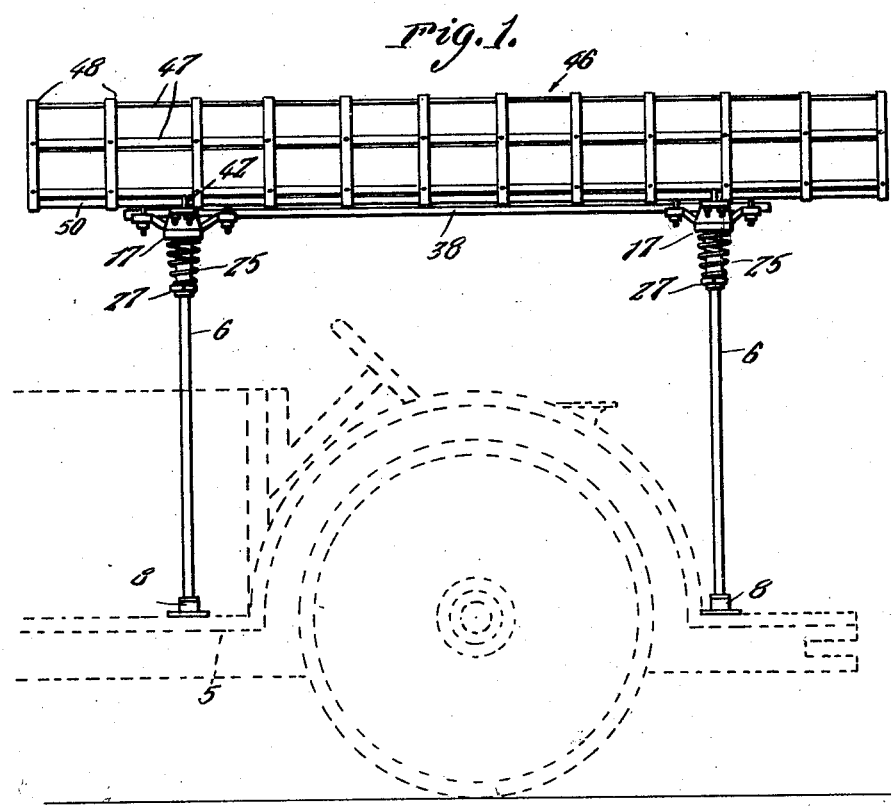
Figure 1 is a side elevation of my improved canopy and showing the same associated with a tractor.

With reference more in detail to the drawings it will be seen that the reference character 5 designates a tractor which is of the usual or conventional structure, from which rise at the front and rear thereof, a plurality of standards 6. There are of course four of these standards 6, two forwardly of the tractor seat and on opposite sides of the tractor, and two rearwardly of the tractor seat, one to each side of the seat. Each of the standards 6 are preferably secured to the frame of the tractor by means of a ball and socket connection designated generally as at 8.

As shown to advantage in Figure 3 the standards 6 are preferably hollow in construction, open at their top ends and are adapted to receive a plunger 7, the upper end of which plunger is formed with external screw threads for threadedly receiving a plunger plate 9 as at 10. The standards 6 are provided adjacent their upper ends with a nipple 11, the upper end of which nipple terminates below the upper end of the standard, the said upper end of the nipple being screw-threadedly engaged as at 12 to a suitable coupling 13, the opposite end of said coupling 13 terminating substantially flush with the upper edge of the standard 6, and this said upper end of the coupling 13 being screw threaded to receive the complemental screw threaded portion 14 of a suitable bushing 15 as clearly illustrated in Figure 3. The plunger plate 9 is suitably flanged as at 16, which flanges 16 rest upon the upper face of the bushing 15 as illustrated. A frog designated generally by the reference character 17 has its base portion 18 resting upon the upper surface of the plate 9, and the said base portion 18 of the frog is provided with an opening 19 which openings are adapted to register with suitable openings formed in the plunger plate 9, and the elongated jay bolts 20 pass or are passed through the registering openings in the plate and frog as shown in Figure 3. The upper ends of the jay bolt are provided with a suitable nut 21, and the opposite ends of each of the jay bolts are terminated in hooks 22, the hooked ends of the jay bolts are adapted to engage one end of a coil spring 23. The coil spring 23 as shown is of the coiled variety, and is coiled about the upper end of the bushing 11, around the coupling 13 and has its opposite end abutting against a washer 24 carried by the bushing 15. Thus it will be seen that by this arrangement of the jay bolts 20 and the spring 23 the frog 17 is being urged downwardly against the plate 9. A relatively larger coil spring 25 is coiled about the entire assembly as above described, and one end of this coil spring is adapted to abut against a washer 26 suitably supported on a lock nut 27 screw threaded to the bushing 11 at the lower end of the bushing as designated at 28. The opposite end of the spring 25 is adapted to be received in a groove 29 suitably formed in the under face of the plate 9 and extending around the periphery of the plate as clearly illustrated. Thus it will be seen that the spring 25 will push against the plunger plate 9 urging the plate upwardly and against the frog 17 against the downward action of the spring 23 thus providing a durable and resilient connection which will effect a cushioning device for the canopy to be mounted and supported in a manner to be presently described.

Extending from the base 18 the frog is provided with the upwardly and outwardly extending arm 29, to be herein designated the right arm, and a similar upwardly and outwardly left arm 30. The arm 29 is provided with a channel 31 and the arm 30 with a channel 32 in alinement with the channel 31.

The frog is further provided with a front arm 33 and a rearwardly extending arm 34 together with a longitudinally extending channel 35, which channel extends across the base 18 and terminates at the end of each of the arms 34 and 35. Connecting the upper end of each pair of standards 6 is a transverse horizontally disposed end member 36 which end members 36 are each in the form of an elongated tube of hollow construction, and each of said end members adjacent their ends rest in the grooves 31 and 32 of the respective arms 29 and 30 of the frog, and the said ends of the end member 36 is held in place within the respective grooves by means of U-bolts 37, the legs of which extend through openings 37' suitably formed in each of the arms 29 and 30, as shown to advantage in Figures 2 and 5. Horizontally disposed side members 38 have their opposite ends adapted to rest in the channel 35 and are suitably held in place by means of U-bolts 39 extending through suitable openings 39' formed in the front and rear legs respectively, of the frogs.

Figures 6, 7:
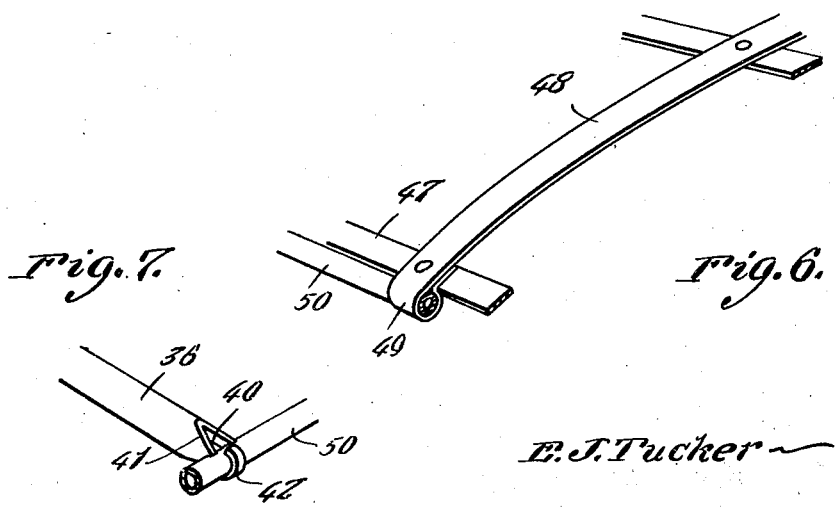
Figure 6 is a detail perspective illustrating the manner of securing the frame to one of the side members.
Figure 7 is a detail perspective showing the manner of securing the canopy frame upon the support.

Each of the end members 36, at the opposite ends thereof are bifurcated as at 40, and the said bifurcated ends of the members 36 are beveled on their top and bottoms as at 41 as shown to advantage in Figure 7. Slidably received within each end of the members 36 is a hook shaped member 42, which hooked shaped members 42 are normally urged inwardly of the end members 36 by means of a coil spring 43, one end of which coil spring is anchored to the inner end of the hook members 42 as at 44, and the opposite end of the spring 43 being anchored inwardly from the ends of the members 36, as at 45.

The invention further contemplates the provision of a suitable canopy shaped frame designated generally by the reference character 46. The frame 46 embodies a plurality of elongated relatively narrow spring metal straps 47 disposed in spaced parallelism. These straps 47 are secured together at their ends, and at their intermediate portions by means of transversely extending spaced metal straps 48, which are also of spring like texture.

Each of the transverse straps 48 terminate at their opposite ends in suitable eyes 49. The invention also contemplates the provision of a pair of elongated rods 50, and each of the said rods 50 are adapted to be received in the eyes 49 formed at the opposite ends of the straps 48 as illustrated in Figure 6. When the frame 46 and rod 50 are assembled in this manner the same may then be placed in proper position upon the supporting standard in the following manner.

Each of the rods 50 are disposed horizontally one adjacent each of the side members 38 and have their opposite ends placed against the adjacent bifurcated end of each of the end members 36. The hooks 42, which of course have been extended outwardly from each end of the end members 36 are then engaged in an obvious manner with the said ends of the members 50, and as is apparent due to the action of the spring 43 the hooks 42 being drawn inwardly will tightly clamp the members 50 against the said bifurcated ends of the end members 36. Thus it will be seen that the frame will be rigidly and securely supported, and of course it is to be understood that the width of the frame 46 is relatively greater than the length of each of the side members 36 so that when the frame is positioned as hereinbefore set forth the flexibility of the straps 48 will permit the frame to arch when not disposed so as to assume a somewhat canopy like position as clearly illustrated in Figure 2. It is of course to be understood that a sheet of canvas or any other like material is to be placed over the frame 46 and secured thereto in any suitable manner, so as to provide a suitable shade or top for the tractor.

The frame 46 being formed of the flexible strap 47 and 48 will permit the frame, after the rods 56 have been withdrawn from the eyes 49 to be folded in a manner as shown in Figure 4, that is starting the folding at one end instead of lengthwise so as to permit a neat compact bundle either for shipping or for any other purpose. When of course the frame is folded in this manner it may be held in its folded position by means of suitable cords or other tying means as designated at 51.

From the foregoing then it will be seen that I have provided a very efficient means whereby a suitable canopy or sun shade may be supported on a tractor together with suitable cushioning means whereby the canopy frame will be cushioned upon any swaying movement from side to side thereof, such as might be caused by the striking of some stationary object while the tractor is in motion, and wherein the frame at its front and rear will also be suitably cushioned against vibration and jar of the tractor, when the same may be proceeding over rough and pumpy surfaces.

It is also to be understood while I have herein shown and described the canopy as being applicable to a tractor, it is to be understood that the canopy is fully capable of being used on threshers or any other similar form machinery.

Even through I have herein shown and described certain detailed structural elements of the invention, it is to be understood that the same is fully capable of certain changes comprehended by the spirit of the invention as herein described, and the scope of the appended claims.

Having thus described the invention, what I claim as new and desire to secure by Letters Patent is:—

1. In a structure of the class described, a base, a plurality of supporting standards rising from the base, yielding devices carried by each of said standards at the upper end of the respective standards, side and end members adapted to be supported on said yielding devices, a resilient frame structure, spring actuated hook members carried by each of said end members, and said hook members being adapted to engage said frame at opposite sides thereof for holding the frame in an arched position above said standards.

2. In a structure of the class described, the combination of a tractor, a pair of standards rising from the tractor at opposite sides of the tractor adjacent the forward end of the tractor, resilient devices carried at the upper ends of said standards, an elongated tubular member having its opposite ends adapted to rest on the adjacent resilient devices, a second pair of standards rising from opposite sides of the tractor adjacent the rear end of the tractor, resilient devices carried at the upper end of each of said standards of the second pair, an elongated member of tubular construction having its opposite end adapted to rest upon the said last mentioned resilient devices, hooks slidably mounted in the ends of each of said tubular members, a resilient frame structure, rigid side members carried by said resilient frame and adapted to be engaged by the hook for supporting the frame above said standards.

3. In a structure of the class described, the combination of a tractor, a pair of standards rising from opposite sides of the tractor adjacent the forward end of the tractor, resilient devices carried at the upper end of each of said standards, a second pair of standards rising from the opposite sides of the tractor adjacent the rear end of the tractor, resilient devices carried at the upper ends of said last mentioned pair of standards, an elongated tubular rod of hollow construction having its ends adapted to rest on the resilient devices carried by the standards of said first mentioned pairs, a second tubular rod of hollow construction having its ends adapted to rest on the resilient devices of said last mentioned pair of standards, means for securing the ends of each of said tubular members to the resilient devices, hooks slidably mounted in the ends of each of said tubular members, spring means for normally urging the hooks inwardly of the said tubular members, and a substantially elongated rectangular resilient frame structure embodying longitudinal rigid side members adapted to be engaged by each of said hook members for holding said frame structure in a substantially arched position above the standards.

4. In a structure of the class described, a base, a plurality of supporting standards rising from said base, a horizontally disposed elongated tubular member supported on the upper ends of said standards, hooks slidably mounted in the ends of said tubular member, a resilient frame structure, said hooks adapted to engage said frame structure at opposite sides of the latter, above said standards.

5. In a structure of the class described, a base, a plurality of supporting standards rising from said base, a horizontally disposed elongated tubular member supported on the upper ends of said standards, hooks slidably mounted in the ends of said tubular member, a resilient frame structure, said hooks adapted to engage said frame structure at opposite sides of the latter, above said standards, said resilient frame structure being of a width greater than the length of said tubular member, and spring means for normally urging said hooks inwardly from the opposite ends of said tubular member, whereby when said resilient frame structure is positioned between said hooks for engagement therewith, said frame structure will be retained above said supporting standard in an arched position.

6. In a structure of the class described, a base, a pair of supporting standards rising from said base, yielding devices carried at the upper ends of said standards, an elongated member of tubular construction having its ends adapted to rest upon said resilient devices, means for securing the ends of said tubular member to said resilient devices, hooks slidably mounted in the ends of said tubular member, spring means for normally urging the hooks inwardly of said tubular member, and a substantially elongated rectangular resilient frame structure embodying longitudinal rigid side members adapted to be engaged by each of said hook members for holding said resilient frame structure in a substantially arched position above the standards.

7. In a structure of the class described, a base, a plurality of supporting standards rising from the base, yielding devices carried by each of the standards at the upper ends of the standards, spring pressed hooks arranged on said resilient devices, a resilient frame structure, and said hooks adapted to engage said frame structure for supporting the latter above said standards.

8. In a structure of the class described, a plurality of supporting standards, a plunger member slidable in the upper end of each of said standards, a plate mounted on the upper end of said plunger members, a frog resting upon the respective plates, an elongated tubular member having its opposite ends anchored to the frog upon the respective standards, spring pressed hooks carried by said tubular member at the opposite ends thereof and adapted to be moved outwardly of said ends, and a resilient frame structure adapted to be engaged at opposite sides thereof with said hooks whereby said structure may be supported in an arched position above said standards.

In testimony whereof I affix my signature.

ELA J. TUCKER.